US012658844B2

(12) United States Patent (10) Patent No.: US 12,658,844 B2
Blommaert et al. (45) Date of Patent: Jun. 16, 2026

(54) HATCH, E.G. FOR AN INLAND WATERWAY CARGO VESSEL, PROVIDED WITH PHOTO-VOLTAIC CELLS

(71) Applicant: Blommaert N.V., Wijnegem (BE)

(72) Inventors: Tom Blommaert, Wijnegem (BE); David Michel Kester, Rotterdam (NL); Kasper Keizer, Rotterdam (NL); Flip Alkemade, Rotterdam (NL)

(73) Assignee: BLOMMAERT N.V., Wijnegem (BE)

( * ) Notice: Subject to any disclaimer, the term of this patent is extended or adjusted under 35 U.S.C. 154(b) by 398 days.

(21) Appl. No.: 18/566,321

(22) PCT Filed: May 30, 2022

(86) PCT No.: PCT/EP2022/064586
§ 371 (c)(1),
(2) Date: Dec. 1, 2023

(87) PCT Pub. No.: WO2022/253745
PCT Pub. Date: Dec. 8, 2022

(65) Prior Publication Data
US 2024/0266996 A1 Aug. 8, 2024

(30) Foreign Application Priority Data
Jun. 3, 2021 (NL) ...................................... 2028378

(51) Int. Cl.
*H02S 40/32* (2014.01)
*B63B 35/00* (2020.01)
(Continued)

(52) U.S. Cl.
CPC .............. *H02S 40/32* (2014.12); *B63B 35/00* (2013.01); *B63J 3/00* (2013.01); *H02S 30/20* (2014.12);
(Continued)

(58) Field of Classification Search
CPC ........ H02S 40/32; H02S 40/10; H02S 40/425; H02S 30/20; B63B 35/00; B63B 2035/002; B63J 3/00
See application file for complete search history.

(56) References Cited

U.S. PATENT DOCUMENTS 6,352,046 B1 3/2002 Berg, Sr. et al.
9,919,784 B1 * 3/2018 Fisher .................... B63H 21/17

FOREIGN PATENT DOCUMENTS

BE 1008904 A3 8/1996
CN 201268386 Y 7/2009
(Continued)

OTHER PUBLICATIONS

Dutch Search Report, issued in Priority Application No. 2028378, dated Feb. 1, 2022.
(Continued)

*Primary Examiner* — Stephen P Avila
(74) *Attorney, Agent, or Firm* — Birch, Stewart, Kolasch & Birch, LLP

(57) ABSTRACT

A hatch configured to be placed in an operative position thereof over a storage space in a removable or displaceable manner, e.g. over a cargo hold of an inland waterway cargo vessel, the hatch having a width and a length, and the hatch being configured to be supported at each one of opposed sides thereof seen in direction of the width of the hatch by a support structure, the hatch in the operative position covering the storage space directly underneath. A surface area of the hatch is provided with photo-voltaic cells. The hatch includes, integrated therewith, a power converter system connected to the photo-voltaic cells and configured to convert the electrical energy entering the converter system into another output form of electricity, the power converter being connectable, e.g. via an electrical connector integrated with the hatch, to a grid and/or a remote consumer of the outputted electricity.

16 Claims, 5 Drawing Sheets

(51) Int. Cl.

| | | |
|---|---|---|
| *B63J 3/00* | (2006.01) | |
| *H02S 30/20* | (2014.01) | |
| *H02S 40/10* | (2014.01) | |
| *H02S 40/42* | (2014.01) | |

(52) U.S. Cl.

CPC ............ *H02S 40/10* (2014.12); *H02S 40/425* (2014.12); *B63B 2035/002* (2013.01)

(56) References Cited

FOREIGN PATENT DOCUMENTS

| | | | | | |
|---|---|---|---|---|---|
| CN | 204548399 | U | 8/2015 | | |
| CN | 211364900 | U | 8/2020 | | |
| EP | 1 132 290 | A1 | 9/2001 | | |
| GB | 2 399 544 | A | 9/2004 | | |
| JP | 2003-318433 | A | 11/2003 | | |
| JP | 2015-205604 | A | 11/2015 | | |
| WO | WO-9954195 | A1 * | 10/1999 | ............ | B63B 11/02 |
| WO | WO 2016/077357 | A1 | 5/2016 | | |

OTHER PUBLICATIONS

International Search Report, issued in PCT/EP2022/064586, dated Aug. 5, 2022.
Written Opinion of the International Searching Authority, issued in PCT/EP2022/064586, dated Aug. 5, 2022.

* cited by examiner

HATCH, E.G. FOR AN INLAND WATERWAY CARGO VESSEL, PROVIDED WITH PHOTO-VOLTAIC CELLS

FIELD OF THE INVENTION

The present invention relates to the generation of electricity by means of a hatch that is configured to be placed in an operative position thereof over a storage space in a removable or displaceable manner, e.g. over a cargo hold of an inland waterway cargo vessel.

The hatch has a width and a length, and the hatch is configured to be supported at each one of opposed sides thereof seen in direction of the width of the hatch by a support structure, e.g. the coaming of a cargo vessel, the hatch in the operative position covering a part of the storage space directly underneath.

BACKGROUND OF THE INVENTION

In the field, experiments have been done to provide hatches, e.g. to be placed over a cargo hold of an inland waterway cargo vessel, with photo-voltaic cells. So far, the practical implementation is not entirely satisfactory.

OBJECT OF THE INVENTION

The present invention aims to provide measures that allow for enhanced practical implementation of photo-voltaic cells on hatches.

SUMMARY OF THE INVENTION

According to a first aspect thereof, the invention provides a hatch which is configured to be placed in an operative position thereof over a storage space in a removable or displaceable manner, e.g. over a cargo hold of an inland waterway cargo vessel, the hatch having a width and a length, and the hatch being configured to be supported at each one of opposed sides thereof seen in direction of the width of the hatch by a support structure, the hatch in the operative position covering the storage space directly underneath.

A surface area of the hatch is provided with photo-voltaic cells.

The hatch comprises:

integrated therewith, a power converter system that is connected to the photo-voltaic cells and that is configured to convert the electrical energy entering the converter system into another output form of electricity, the power converter system being connectable, e.g. via an electrical connector integrated with the hatch, to a grid and/or a remote consumer of the outputted electricity.

Due to this arrangement, the individual hatch effectively acts as a stand-alone electricity generator. The electricity is outputted by the power converter system that is integrated with the hatch. For example, the hatch is provided with one or more compartments, e.g. welded into the structure of an aluminium hatch, in which the one or more electronic components of the power converter system are accommodated, e.g. one or more watertight compartments, e.g. each compartment being accessible from underneath the hatch.

The first aspect of the invention avoids the need for conversion to the desired output form by a converter that is remote and distinct from the hatch, e.g. by a converter that is mounted to the coaming of a cargo vessel having a cargo hold or elsewhere on the vessel.

The first aspect of the invention may, in embodiments, allow for variation of the number of such hatches that are connected to an electric grid, e.g. a grid of a cargo vessel, without undue efforts as each hatch performs its own power conversion by means of its integrated power converter system.

In an embodiment, the hatch is connectable to an electric grid of an inland waterway cargo vessel. For example, regular consumers like household equipment, vessel electronics (navigation, radar, lights, etc.) are connected to the grid. For example, the vessel has a location for storage of an electric vehicle and a loading station, wherein the loading station is connected to the grid so that electricity generated by one or more hatches charges the battery of the vehicle.

In an embodiment, each hatch is provided with an electrical connector so that the assembly composed of the photo-voltaic cells and power converter system of the hatch can be readily connected and disconnected from the consumer, e.g. from a grid onboard a vessel which comprises the remote consumer.

In an embodiment, an inland waterway cargo vessel is provided with a grid having electrical connectors at least in a number equal to the number of hatches according to the first aspect of the invention, e.g. at each location where hatch according to the first aspect of the invention is to be placed in operative position thereof over the cargo hold of the vessel. For example, a series of connectors are arranged along the length of a coaming of the vessel for connection to the hatch.

In an embodiment, the electrical connector is configured to be connected to an adjacent hatch, so as to create a chain of electrically connected hatches, e.g. the chain having one take-off point on one hatch that is to be connected to the grid of a vessel. This approach avoids the need, for example, for a lengthy cable along the coaming, yet is less flexible in the placement of hatches.

The electrical connector of a hatch can be of various designs. For example, the connector can be movably mounted to the hatch, e.g. so as to be retracted or even hidden when not in use. For example, the connector is to be combined or integrated with a locking member of the hatch, e.g. so that the act of locking the hatch, e.g. to the coaming, also creates an electrical connection, e.g. to the grid of the vessel.

In an embodiment, the electrical connector is configured for inductive connection to the consumer, e.g. to the grid.

In an embodiment, the electrical connector on the hatch is configured as a sliding connector, e.g. in conjunction with a telescopic hatch system.

In another embodiment, the hatch, e.g. in a telescopic hatch system, is provided with an electrical cable, e.g. stored on a reel and/or as a drag chain, which cable extends from the power converter system and is connected to the consumer, e.g. to a grid of the vessel.

The converter system in the invention is configured to convert the energy obtained through the photo-voltaic cells into a desired output form of electricity, for example into:

alternating current (or AC) electricity, preferably three-phase AC electricity, e.g. congruent with the requirements of the consumer and/or the grid that is connected to the output of the converter system, e.g. congruent with the standards of the geographical location in which the converter system is operating e.g. whereas within the EU three phase electricity often has a line to line voltage of 400V and a line to neutral voltage of 230V the US often utilises a line to line voltage of 208V and a line to neutral voltage of 120V.

single-phase AC electricity e.g. congruent with either the requirements of the consumer and/or grid that is connected to the output of the converter system, e.g. congruent with the standards of the geographical location in which the converter system is operating, e.g. a line to neutral voltage of 230V and a frequency of 50 Hz according to EU standards, a line to neutral voltage of 120V and a frequency of 60 Hz according to US standards, or another required voltage and frequency.

direct current (or DC) electricity e.g. stepped up or down according to the requirements of the consumer or the grid, e.g. a DC motor or a battery.

In an embodiment, the power converter system is configured to monitor the voltage and/or frequency at the output side of the converter system when connected to the consumer and/or the grid, and is configured to disable the supply of electricity in case the monitoring indicates that one or both of the voltage and frequency are outside of a pre-set operational window, e.g. as a safety measure and/or to stabilise the grid to which the converter system is connected.

For example, the hatch is an inland waterway cargo vessel hatch configured to cover, e.g. in a hatch system of multiple hatches, the cargo hold of the vessel.

For example, the vessel is a self-propelled vessel, e.g. the vessel having a propulsion system including an electric motor.

For example, the onboard consumer to which the one or more hatches are connectable is an electric propulsion motor of the vessel and/or a battery for storage of electricity and/or a generator for hydrogen that is stored for later supply to a fuel cell generating electricity to power the electric propulsion motor or another consumer.

For example, the electric connector is provided at a side of the hatch, e.g. to be readily accessible by a person walking over a walkway of the vessel bounded by the coaming on which the respective side of the hatch is supported. This, for example, allows for easy connection of the electrical connector of the hatch to an electrical connector present on the coaming at the planned operative position of the hatch. For example, one or more electrical cables provided with electrical connectors are mounted along the coaming of the cargo hold of the inland waterway cargo vessel, e.g. for manual connection to the connectors of the hatches placed on the coamings to cover the hold.

It is also envisaged, in embodiments, that the vessel lacks a propulsion system, e.g. is a non-propelled push barge. For example, in a practical use, multiple push barges are moored in a harbour (e.g. waiting to be loaded or unloaded), the hatches of the barges meanwhile each generating electricity, e.g. three phase electricity. For example, the electricity that is generated is supplied to a land-based consumer, e.g. the equipment used for loading/unloading, road vehicles, e.g. road vehicles involved in handling of the load of the barges, etc. One could also supply the electrical energy generated by hatches on the one or more push barges to the on-board grid of a push boat, e.g. of an electric propulsion push boat.

In an embodiment, the vessel is a push barge system with a push boat and one or more push barges. For example, the one or more push barges have the hatches that generate electrical energy and the consumer of the energy is located on the push boat. For example, the consumer is an electric propulsion drive motor of the push boat, a generator for hydrogen that is used to fuel a propulsion drive of the push boat, etc. The connection between the hatches and the consumer can be made by electrical cables extending between the push barges on the one hand and the push boat on the other hand.

For example, onboard an inland waterway cargo vessel where multiple hatches, forming a hatch system, are present to cover the cargo hold, the first aspect of the invention allows for a desired number of hatches to be placed over the cargo hold and to be each connected to an electrical grid of the vessel when the hatch is placed at the operative position. If it is desired to just cover a part of the cargo hold, this can be done by simply leaving away (e.g. on a stack) the other hatches, which are then not used to generate electricity. Therefore, the first aspect of the invention offers a flexible electrical energy generating approach.

In an embodiment, the photo-voltaic cells of the hatch are arranged in three parallel lanes extending in the direction of the width of the hatch, each lane of photo-voltaic cells providing energy for one of the three phases of the three-phase electricity.

In an embodiment, the photo-voltaic cells of the hatch are arranged in three parallel lanes extending in the direction of the width of the hatch, each lane of photo-voltaic cells contributing to providing energy for a single phase AC or DC electricity.

In an embodiment, one hatch is configured to output via the power converter system thereof a single phase AC electricity. In embodiments, three of such hatches are connected to a three phase AC electricity grid, each hatch providing electricity for one phase thereof.

In an embodiment, sets of the photo-voltaic cells are laminated between protective top and backing layers.

For example, the top layer is a polymer top layer. Obviously, the top layer is transparent so that sunlight can reach the photo-voltaic cells.

For example, the backing layer is a polymer backing layer. In embodiments, the backing layer is opaque. In another embodiment, the backing layer is transparent.

For example, encapsulating material is present between the layers.

For example, the laminate is applied directly onto a surface of the hatch, e.g. on a planar portion of the hatch, e.g. of the aluminum hatch, e.g. by an adhesive, e.g. stripes of an adhesive compound. Alternatively, or in combination with an adhesive compound, an adhesive tape could be used for securing the laminate on the hatch.

In embodiments, securing the laminate on the hatch (also) involves clamping the laminate onto the hatch. For example, clamping strips extend over one or more edge zones of the laminate, e.g. along all edge zones or along an opposed pair of edge zones. For example, stud welded bolts are welded to the hatch and the clamping strip(s) are tightened by nuts on these stud welded bolts. This avoids the presence of potential leakage spots in the (metal, e.g. aluminum) hatch. The provision of one or more clamping strips for the laminate, may also provide extra safeguard against undue mechanical contact with the laminate, e.g. when handling and/or stacking hatches. The nuts may be welded to the bolt so as to avoid undoing the nuts.

For example, the laminate including the photo-voltaic cells is applied onto a surface of the hatch, e.g. directly applied with its backing layer onto a surface of the hatch, e.g. using an adhesive.

For example, the laminate including the photo-voltaic cells has a thickness of at most 5 millimeters, e.g. between 0.5 and 3 millimeters, e.g. between 1.5 and 2.5 millimeters.

For example, the laminate has a weight of at most 3.5 kg/m2. Compared to ordinary glass surface photo-voltaic panels, which have a weight between 8 and 25 kg/m2, the laminate is thus much lighter. When applied on a vessel, e.g. an inland waterway cargo vessel, this significantly saves weight and thus avoids undue reduction of the load capacity of the vessel and/or undue increase of waterline depth of the vessel, e.g. in view of low water heights in summer on rivers. Also energy required for propulsion of the vessel is not unduly affected by the extra weight of the laminate. The laminate also does not require a strengthening of the hatch, and thus increase of its weight, and does not place additional requirements on a cart for lifting and handling the hatch (when present).

In an embodiment, direct application of the laminated photo-voltaic cells onto the hatches is done by stripes or lines of adhesive wherein the direct application leaves a clearance between the hatch and the laminated photo-voltaic cells where the strips or lines of adhesive do not make contact with the hatch and/or laminated photo-voltaic cells.

In an embodiment, the clearance between the laminated photo-voltaic cells and the hatch after application of adhesive is very small, e.g. negligible or close to nil.

In an embodiment, the clearance between the laminated photo-voltaic cells and the hatch after application of adhesive is used to cool the photo-voltaic cells, e.g. by means of airflow and/or by a liquid cooling system e.g. water flowing past the laminated cells.

In an embodiment, the hatch is provided with a cooling and/or cleaning system, e.g. a water based cooling and/or cleaning system. For example, the hatch is provided. with one or more spray nozzles to spray the photo-voltaic cells, e.g. the laminate, e.g. in view of cleaning and/or cooling. For example, dust created during loading/unloading of the cargo hold of a vessel may impair the efficiency of the photo-voltaic cells. By spraying water this may be resolved. Cooling may also enhance the efficiency of the photo-voltaic cells. For example, one or more cooling water ducts are integrated in the hatch. For example, each hatch is provided with a water inlet connector and a duct leading to one or more of spray nozzles and/or cooling ducts. For example, the vessel is provided with a deck washing pump and corresponding ducting, wherein the hatch is connectible to said deck washing pump and/or ducting, e.g. via a hose.

In an embodiment, the cooling and/or cleaning system is powered by and/or regulated by the power converter system, e.g. to prolong the life expectancy and/or improve the efficiency of the photo-voltaic cells.

In an embodiment, the hatch has a rigid hatch body with three segments seen in direction of the width of the hatch:
- opposed first and second side segments at the respective sides of the hatch, each side segment being configured to be supported on a support structure,
- a central segment situated in between the side segments, wherein the side segments are each inclined downwards from the central segment to the respective side,
- wherein the central segment comprises a substantially horizontal surface, e.g. embodied as a walkway. Optionally, each side segment has a shiftable plate and an associated shifting mechanism configured to adjust the width of the hatch. Preferably, the side segments are of equal width. Preferably, the central segment is situated higher than the sides of the hatch, preferably at an equal or lower height than the adjoining inner ends of the side segments.

Examples of a three segments hatch in which the invention can be implemented are, for example, disclosed in EP 1 132 290.

In an embodiment, a central area of the hatch, e.g. the central segment of a three-segments hatch, is not provided with photo-voltaic cells, e.g. solely the side segments being provided with photo-voltaic cells.

In an embodiment, the power converter is mounted to the central segment of the hatch, e.g. in a compartment accessible from the underside of the hatch, e.g. the compartment having a removable cover.

Preferably, the power converter is mounted within the rigid hatch body, so between the structural top and bottom sides of the hatch body, so as not to extend above or below the hatch body locally, e.g. so as to not impair the stacking height in a stackable hatch embodiment. For example, the stacking height measured when stacking hatches directly on top of one another is less than 12 centimeters per hatch, e.g. between 7 and 10 centimeters, e.g. 8 centimeters. For example, the power converter system, e.g. electrical components thereof, have a height of at most 5 centimeters when mounted in the hatch. Increase of stacking height is undesirable, e.g. in view of the need to have an unobstructed view from the bridge of the inland waterway cargo vessel over the one or more stacks of hatches.

For example, the side segments of the hatch each have a top wall with three parallel planar top wall zones, adjacent top wall zones being connected via a recessed gutter portion of the top wall, wherein the photo-voltaic cells are mounted onto said planar top wall zones. For example, the photo-voltaic cells are laminated between protective top and backing layers, e.g. with encapsulating material between the layers. For example, the laminate is applied directly onto a surface of the hatch, and the laminate having a thickness of at most 5 millimeters. For example, the laminate is adhered by an adhesive, e.g. stripes of adhesive, onto the planar top wall zone.

In an embodiment, the hatch has—seen in cross-section along the length thereof—a corrugated top surface, e.g. of aluminium. Here, in embodiments, a support member, e.g. a support plate or the like, may be mounted, e.g. of aluminium, e.g. welded, over multiple corrugations to provide a planar top wall zone on which a laminate as discussed herein is placed.

In an embodiment, seen in direction of the length of the hatch, the hatch may be shaped like an arc or dome, e.g. made of fibre-reinforced plastic material. In particular, when a laminate as discussed herein is applied, the arc or dome can effectively be covered by photo-voltaic cells.

In an embodiment, the hatch is configured to be slid over the support structures, e.g. the hatch being one of multiple hatches forming a telescoping hatch system wherein hatches slide over one another.

For example, the hatch is slidable over rails mounted to coamings that extend along the longitudinal edges of the open top of a cargo hold of an inland waterway vessel.

For example, the hatch system is a telescopically sliding hatch system including a set of sliding hatches, e.g. five sliding hatches, wherein each sliding hatch slides at its opposed ends over a corresponding horizontal rail of the support structure, and wherein the hatches are configured to slide horizontally over each other in a telescoping manner. For example, the sliding hatches have rollers running over the horizontal rail at each of the opposed sides of the hatch.

In an embodiment, the hatch is configured to be lifted from the support structures, preferably after disconnecting the electrical connector of the hatch when present on the hatch. Preferably, the hatch is one of multiple such hatches covering together the storage space, wherein the hatch is configured to be stacked, possibly in a nested configuration, in a stack of multiple hatches at a parking position remote from the operative position, e.g. at an end of the storage space.

In an embodiment, the hatch is configured such that in a stack of multiple hatches, the hatches stack directly on top of one another without mechanically loading and/or contacting the photo-voltaic cells.

For example, the stacking height of the liftable and stackable hatch with the photo-voltaic cells and with the integrated power converter system is at most 12 centimeters, e.g. between 7 and 10 centimeters, e.g. about 8 centimeters.

For example, the stackable hatch is provided with a locking member, e.g. a movable lip, which is configured to lock the hatch relative to the support structure, e.g. to the coaming of the inland waterway cargo vessel. In embodiments, the locking member as well as the hatch structure is metallic, e.g. of aluminum, with the support structure, e.g. the coaming, also being metallic, e.g. as the vessels hull is of steel. Herein the locking member may serve as earthing conductor for the hatch. In case of a telescopic hatch system, each hatch may be equipped with a sliding electrical contact to earthen the hatch, e.g. to the metal hull of the vessel, e.g. to the coaming.

In use, the stacking of the hatches may serve to shield the photo-voltaic cells on the hatches in a stack of hatches underneath the top hatch of the stack of hatches from direct sunlight, e.g. to avoid that these hatches generate a voltage even when not connected to a consumer and/or grid.

In an embodiment, the top hatch in a set of hatches, either in the telescopic version or in the or liftable and stackable version, is configured without photo-voltaic cells, e.g. such that in their stacked or parking position no voltage is created as the photo-voltaic cells of the hatches underneath the top hatch are shielded from direct sunlight and the top hatch itself has no photo-voltaic cells.

In an embodiment, the system, e.g. the top hatch in a set of hatches, is provided with a removable cover such that when applied, e.g. removably placed over the top hatch, the photo-voltaic cells on the top hatch are shielded from direct sunlight.

An advantage of shielding the photo-voltaic cells from direct sunlight can for instance be to prevent the buildup of a static voltage, which when storing for instance potentially explosive substances is most often a requirement. Furthermore the shielding can serve as a means to avoid soiling, e.g. by dust during loading/unloading the vessel and/or as a means to prolong the life expectancy of the photo-voltaic cells, especially so when they are inoperative e.g. when the converter system is not used to supply power to a consumer but instead idle. To avoid generating a voltage one could also, or alternatively, short circuit the cells.

A second aspect of the invention relates to an inland waterway cargo vessel hatch configured to be placed in an operative position thereof over a storage space in a removable or displaceable manner, the hatch having a width and a length, and the hatch being configured to be supported at each one of opposed sides thereof seen in direction of the width of the hatch by a support structure, e.g. a coaming, the hatch in the operative position covering the storage space directly underneath, wherein a surface area of the hatch is provided with photo-voltaic cells, wherein sets of the photo-voltaic cells are laminated between protective top and backing layers, e.g. of the laminate being applied onto a surface of the hatch, and the laminate having a thickness of at most 5 millimeters.

Due to the limited thickness of the laminate, for example, the second aspect of the invention allows for a stackable embodiment of the hatch, e.g. as discussed herein with respect to the first aspect of the invention. In an embodiment, the hatch of the second aspect of the invention, is configured to be lifted from the support structures, preferably after disconnecting an electrical connector of the hatch, and each hatch is configured to be stacked, possibly in a nested configuration, in a stack of multiple hatches at a parking position remote from the operative position, e.g. at an end of the storage space. Preferably, each hatch is configured with stacking formations such that in a stack of multiple hatches, the hatches stack directly on top of one another without mechanically loading and/or contacting the photo voltaic cells.

If thicker versions of photo-voltaic cells were to be used, stacking becomes more problematic due to the height of the stack. Commonly, the stack or stacks of hatches onboard an inland waterway cargo vessel are in the field of view from the bridge (commonly at the stern of the vessel when self-propelled). A higher stack will impair the view and is thus disadvantageous. The limited thickness does not lead to an (noticeable) increase of the stacking height.

Another disadvantage of the thicker versions of the photo-voltaic cells is related to their weight. In the transport sector all weight reduction is reflected in fuel usage and therefore its cost efficiency and emissions. Furthermore especially as related to (inland) shipping the decrease in weight is of influence on the load that can be carried by the vessel since the total weight of the vessel is related to the depth of the waterways it can traverse which has become a growing issue in recent years.

The thin photo-voltaic cells upon the hatches of the invention are lighter than conventional thicker photo-voltaic cells by a factor of 5 to 15, which taking into account the number of cells envisaged amounts to a considerable weight difference as compared to conventional thicker photo-voltaic cells.

In an embodiment of the hatch of the second aspect of the invention, the hatch has a rigid hatch body with three segments seen in direction of the width of the hatch:

opposed first and second side segments at the respective sides of the hatch, each side segment being configured to be supported on a support structure, a central segment situated in between the side segments, wherein the side segments are each inclined downwards from the central segment to the respective side, wherein the central segment comprises a substantially horizontal surface, e.g. embodied as a walkway. Optionally, each side segment has a shiftable plate and an associated shifting mechanism configured to adjust the width of the hatch. For example, the side segments are of equal width. Preferably, the central segment, is not provided with photo-voltaic cells and solely the side segments being provided with photo-voltaic cells.

The hatch of the second aspect of the invention may comprise one or more features as discussed herein with reference to the first aspect of the invention.

The present invention also relates to a hatch system which comprises multiple hatches as discussed herein, e.g. configured for covering the cargo hold of an inland waterways cargo vessel.

In an embodiment, the hatches of the hatch system are each placeable in an operative position wherein the hatches cover a storage space, e.g. hatches being placeable side-by-side to cover the storage space, and each electrical connector of each hatch is connectable to a remote consumer, wherein the hatches are, after disconnecting of the electric connector thereof, movable or removable for placing the hatch at a parking position.

For example, e.g. as discussed in EP 1 132 290, the hatches are configured to be placed side-by-side on the support structures to cover the storage space, e.g. on coamings of the cargo vessel, wherein each hatch is configured to be lifted from the support structures, preferably after disconnecting the electrical connector of the hatch, and wherein each hatch is configured to be stacked, possibly in a nested configuration, in a stack of multiple hatches at a parking position remote from the operative position, e.g. at an end of the storage space. Preferably, each hatch is configured with stacking formations such that in a stack of multiple hatches, the hatches stack directly on top of one another without mechanically loading and/or contacting the photo voltaic cells.

The present invention also relates to a vessel, e.g. an inland waterway cargo vessel, the vessel having a cargo hold having an open top having a width and a length defined by opposed longitudinal edges, wherein the vessel has a support structure along each longitudinal edge of the open top, e.g. a coaming, wherein the vessel is provided with multiple hatches for covering the cargo hold, at least one or more of said hatches being embodied as discussed herein, wherein the vessel has an electrical grid which comprises a consumer and comprises one or more electrical cables provided with an electrical connector at each operative position of a hatch as discussed herein allowing to connect the three phase electrical connector of the hatch to the grid, e.g. said one or more cables extending along a coaming of the cargo hold.

In an embodiment, the vessel is provided with multiple hatches or a hatch system as discussed herein, which hatches are configured to be placed side-by-side on the support structures, e.g. the coamings, to cover the cargo hold, wherein each hatch is configured to be lifted from the support structures, preferably after disconnecting the electrical connector of the hatch, and wherein each hatch is configured to be stacked, possibly in a nested configuration, in a stack of multiple hatches at a parking position remote from the operative position, e.g. at an end of the storage space.

Preferably, as known in the art, the vessel comprises a cart that is configured for lifting, stacking, and transporting the hatches.

The present invention also relates to a method for generating electricity, wherein (e.g. non-propelled) vessels equipped with hatches as described herein are moored, e.g. waiting to be loaded and/or unloaded, in a harbour, wherein a land-based grid is present and wherein the power converter systems of the hatches of the moored vessel are connected to the land-based grid for supply of electricity to the land-based grid. Often, many tens if not hundreds of push barges may lie in a harbour, which could then temporarily act as an electricity generator for a land-based grid.

The present invention also relates to a land-based storage facility, e.g. for bulk goods, e.g. sand, salt, fertilizer, recycling materials, biomass, etc., the facility comprising a storage space having a roof formed at least in part by one or more hatches as discussed herein.

The present invention also relates to the use of a hatch as described herein for another use than covering a storage space.

The present invention also relates to a method for generating three phase electricity for supply to a consumer, wherein use is made of a one or more hatches as discussed herein.

The invention will now be discussed with reference to the drawings.

DETAILED DESCRIPTION OF EMBODIMENTS

Figure 1:
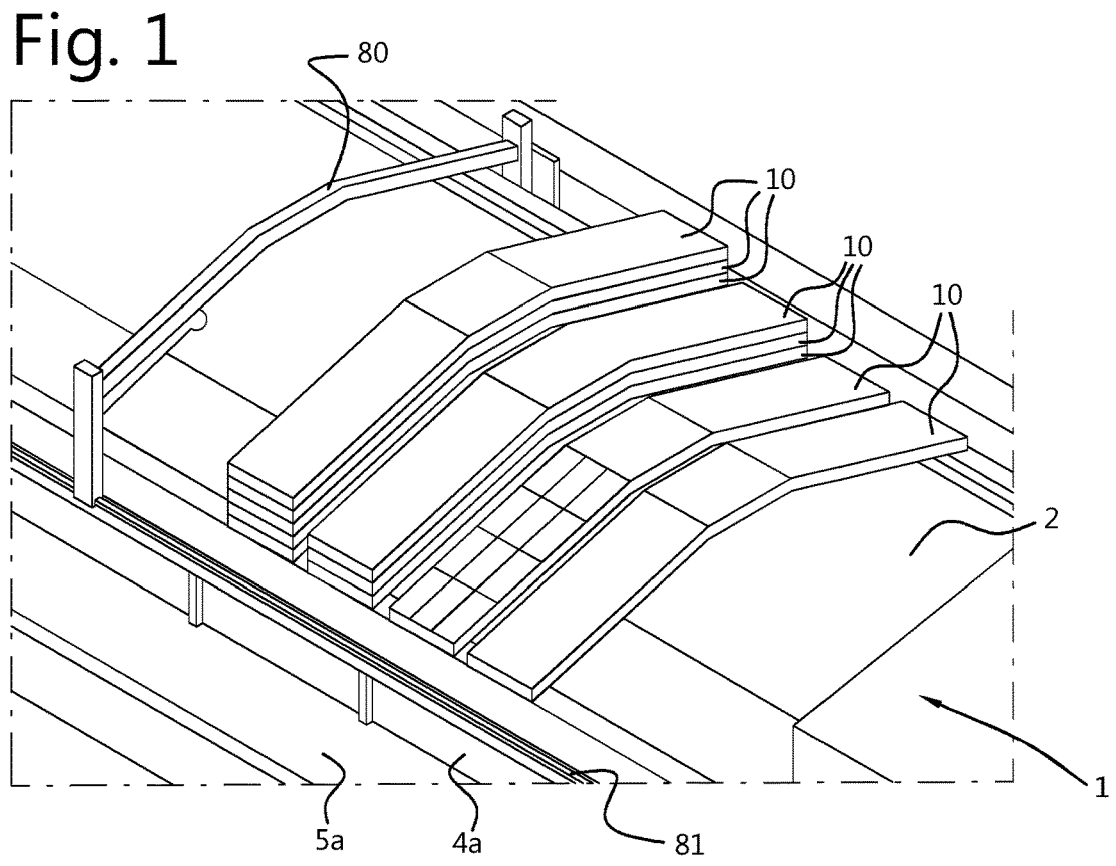
FIG. 1 shows a part of an inland waterway cargo vessel equipped with exemplary hatches according to the invention.
Figure 2:
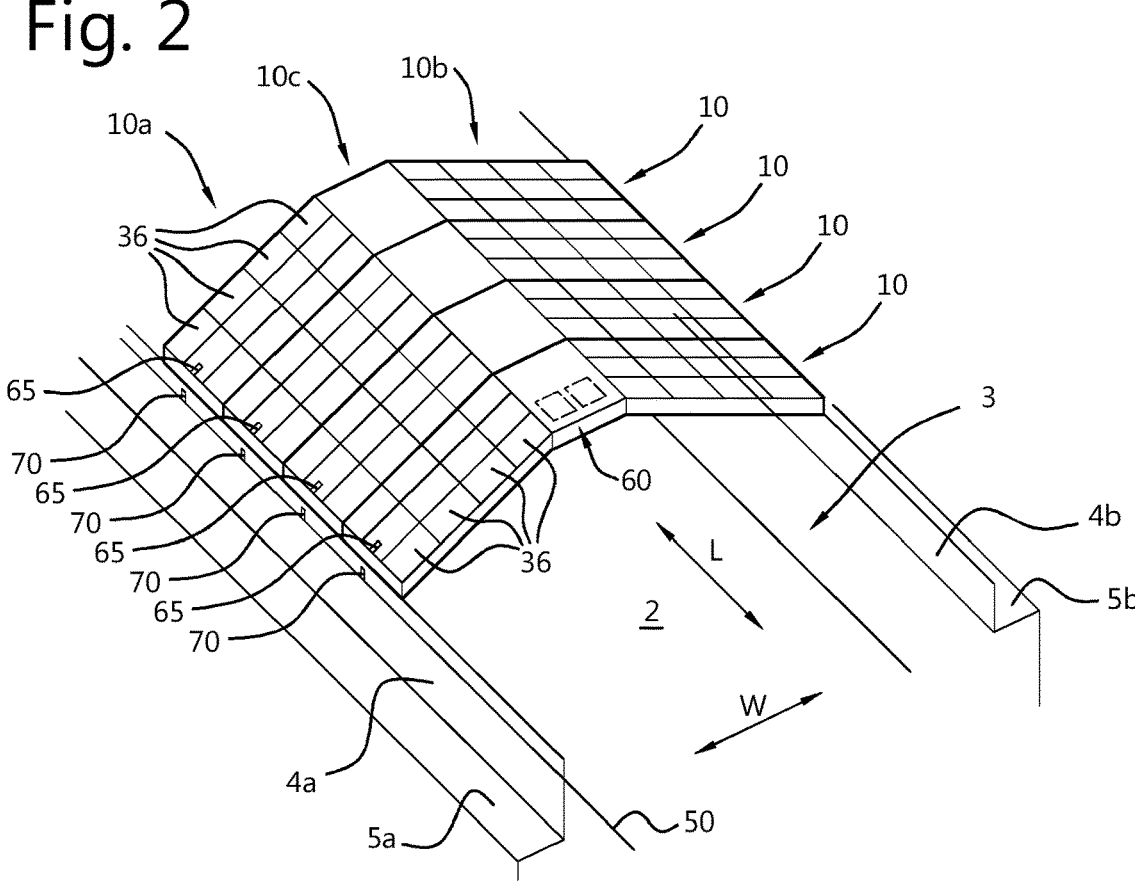
FIG. 2 shows a part of the cargo hold of the vessel of FIG. 1 covered by a number of hatches according to the invention side-by-side.
Figure 3:
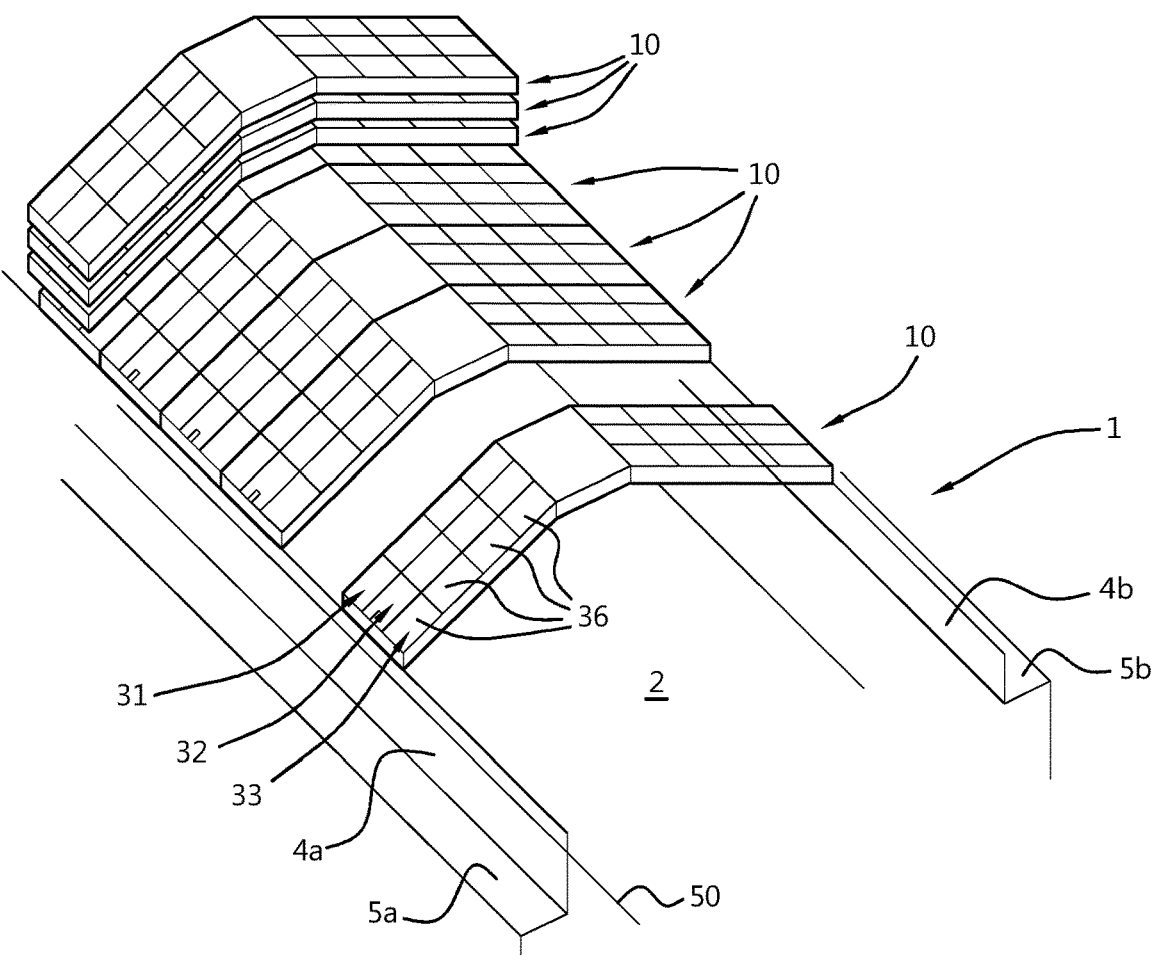
FIG. 3 shows the cargo hold of the vessel of FIG. 1, with some hatches in a stack.
Figure 4:
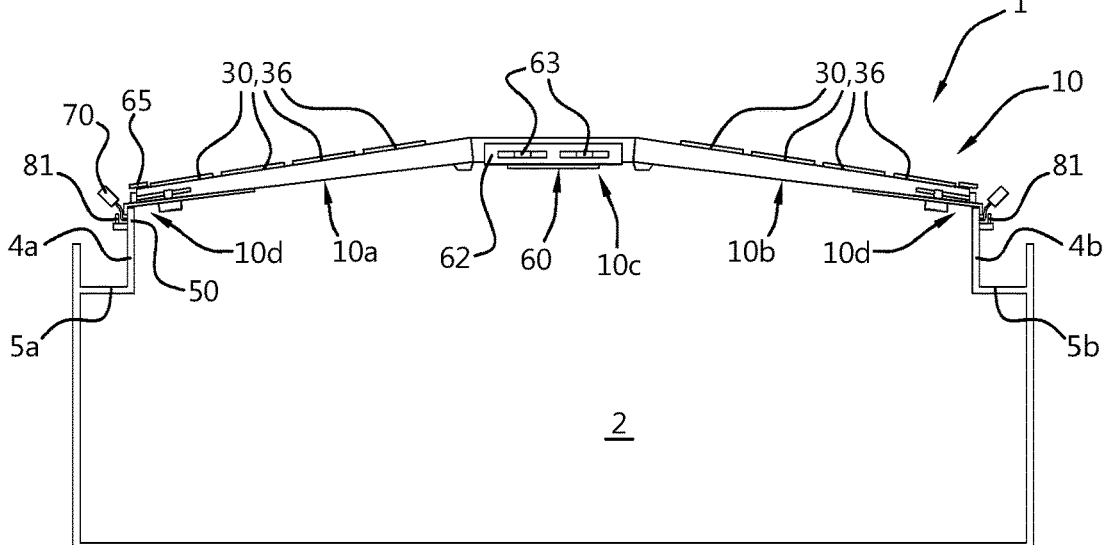
FIG. 4 shows, schematically, a cross-section of the vessel of FIG. 1.
Figure 5:
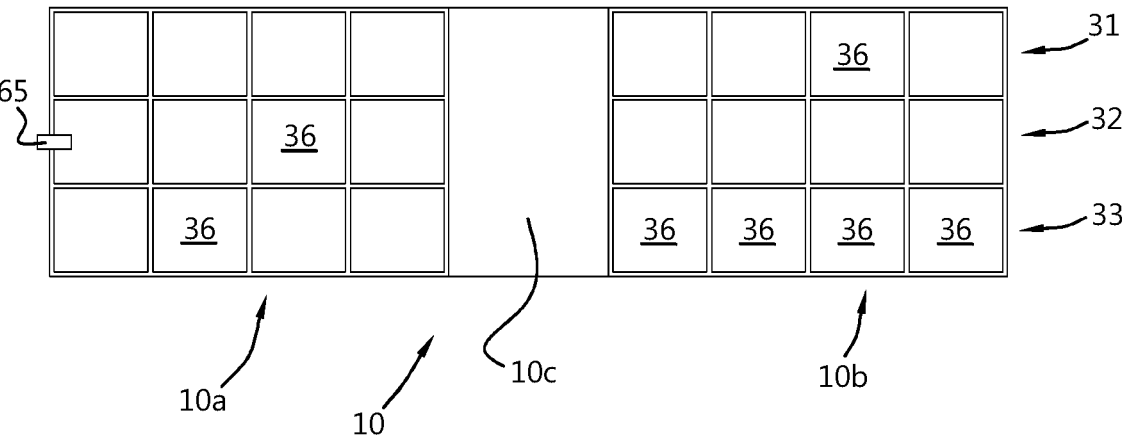
FIG. 5 shows, schematically, the arrangement of photovoltaic cells on the hatch of the vessel of FIG. 1.
Figure 6:
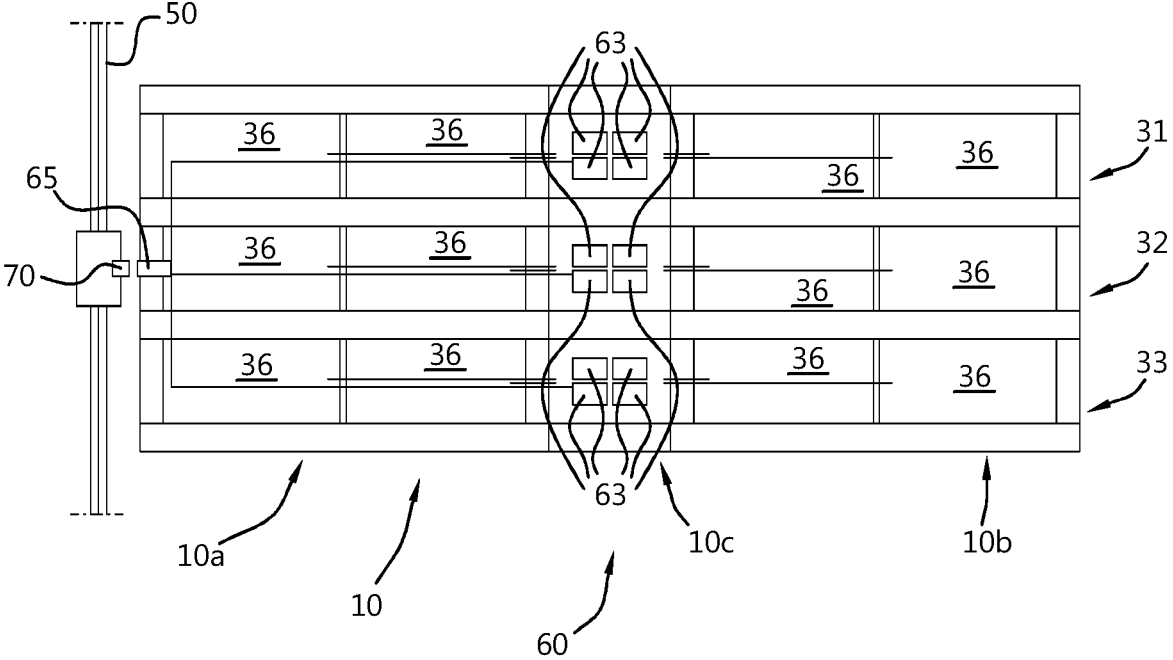
FIG. 6 shows, schematically, the power converter system on the hatches of the vessel of FIG. 1.

In particular in the FIGS. 1-4 an inland waterway cargo vessel 1 is illustrated, e.g. a self-propelled vessel of a non-propelled vessel, e.g. a non-propelled push barge.

The vessel 1 has a cargo hold 2 having an open top 3 having a width W and a length L defined by opposed longitudinal edges of the open top 3 of the hold.

For example, the width is between 8 and 16 meters, e.g. between 9 and 11 meters. For example, the length L is at least 40 meters, e.g. between 60 and 100 meters.

The vessel 1 has a support structure along each longitudinal edge of the open top of the cargo hold, e.g. a coaming 4a, 4b as is known in the art.

As is known in the art, the vessel has a walkable side deck 5a, b between each hatch coaming 4a, b and the outer perimeter of the hull of the vessel. The coaming 4a, b protrudes above the side deck 5a, 5b.

The vessel 1 is provided with a hatch system comprising multiple hatches 10 for covering the cargo hold 4. At least one or more of these hatches 10 are embodied with photovoltaic cells 30 and with an integrated power converter system 60 as described herein.

Generally, the hatches 10 have an operative position on the coamings 4a, 4b in which they cover the cargo hold 2 of the vessel 1, and a non-operative, here stacked position in which the hold 2 is essentially open.

Generally, the vessel 1 has an electrical grid which comprises a consumer, e.g. one or more electrical household appliances, navigation equipment, lighting, and/or propulsion equipment, etc. . . . . . The integrated power converter system 60 of each of the hatches 10 is connected or connectable to the grid.

In the depicted example, the electric grid of the vessel 1 comprises one or more electrical cables 50 that extend along one or both of the coamings 4a, 4b, and that is/are provided with an electrical connector 70 at each operative position of a hatch 10, e.g. a number of connectors 70 corresponding to the number of hatches 10 that can be placed on the coamings. The connectors 70 are connectable to mating connectors 65 on each of the hatches 10, so that the integrated power converter system 60 of each hatch 10 is connectable to the grid of the vessel 1.

It is illustrated, that the hatches 10 are configured to be placed side-by-side on the support structures, here the coamings 4*a,b*, to cover the cargo hold 2.

It is illustrated that each hatch 10 is configured to be lifted from the coamings 4*a, b*, here after disconnecting the electrical connector 65 of the hatch, and each hatch 10 is configured to be stacked, here in a nested configuration, in a stack of multiple hatches 10 at a parking position that is remote from the operative position, e.g. at an end of the hold 2.

It is illustrated, as is known in the art, that the vessel 1 comprises a hatch handling cart 80 that is configured for lifting, stacking, and transporting the hatches 1, here the cart 80 travelling over rails 81 extending along each of the coamings 4*a, b* of the vessel. For example, the cart 80 comprises a motor operated hoisting device, e.g. with an electrical motor, for lifting and lower one or more hatches 10.

It is illustrated, as is known in the art, the hatch 10 has a width that is to be considered in the direction between the coamings 4*a, b* of the vessel. The hatch 10 has a length to be considered along the length of the coamings. It is illustrated, that the width W here exceeds the length L. For example, the width is between 9 and 11 meters, and the length of the hatch is between 3 and 5 meters, e.g. about 4 meters. In the latter case, 20 hatches 10 are required to cover a hold having a length of 80 meters.

In embodiments, the hatch 10 covers between 27 and 55, e.g. about 40 square meters of the cargo hold 2.

It is illustrated, that the hatch 10—in the operative position thereof—covers the part of the cargo hold directly underneath.

At least for some of the hatches 10 a surface area of the top side of the hatch 10 is provided with photo-voltaic cells 30.

Each hatch 10 having such photo-voltaic cells 30 further comprises:

integrated therewith, a power converter system 60 that is connected to the photo-voltaic cells 30 and that is configured to convert the electrical energy generated by the cells 30 and entering the converter system 60 into another output form of electricity, the power converter 60 being connectable, here via an electrical connector 65 that is also integrated with the hatch 10, to a grid and/or a remote consumer of the outputted electricity, here via connector 70 to cable 50.

It is illustrated that an electrical connector 65 is integrated with the hatch 10 and is configured for connecting the power converter system 60 of the hatch 10 to the remote consumer, here via connector 70 of the vessel. The connector 70 is arranged at the operative position of the hatch 10. The connector 70 is connected to a cable 50 that extends along the coaming 4*a,b*.

As preferred, the power converter system 60 is configured to output electricity as three-phase electricity, and the connectors 65 and 70 are configured to transfer the three phase electricity, e.g. 400 V AC electricity, from the hatch 10 to the grid of the vessel 1.

The figures illustrate an embodiment, wherein the photo-voltaic cells 30 of the hatch 10 are arranged in three parallel lanes 31, 32, 33 on the single hatch. These lanes 31, 32, 33 extend in the direction of the width of the hatch 10. Each lane of photo-voltaic cells provides electrical energy for one of the three phases of the three-phase electricity that is outputted by the converter system 60.

Figure 8A:
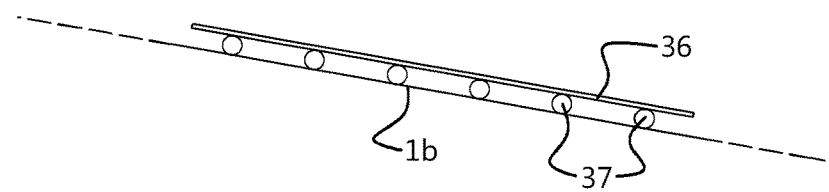
Figure 8B:
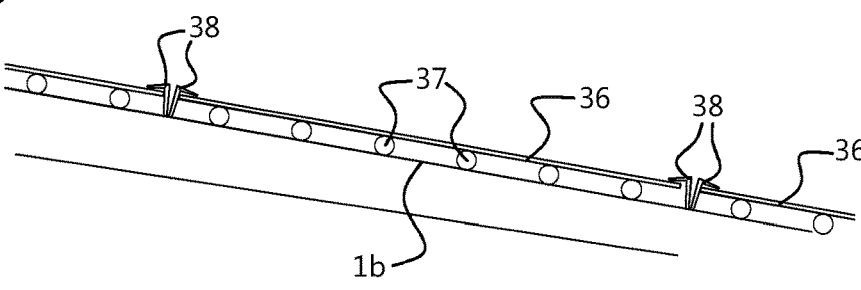
Figure 8C:
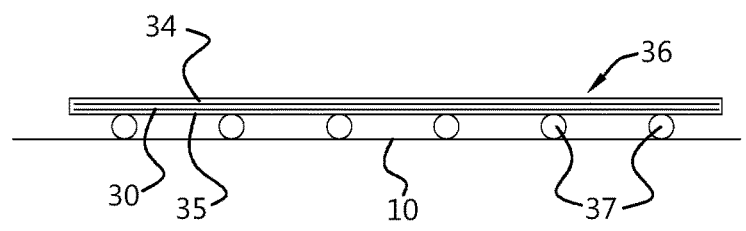

As can be seen schematically in FIGS. 8*a-c*, it is preferred that sets of the photo-voltaic cells 30 are laminated between protective top and backing layers 34, 35 to form a laminate 36. Multiple laminates 36 are applied on the hatch 10, here four laminates 36 per lane.

The figures illustrate that the laminate 36 is applied directly onto a surface of the hatch 10, preferably a planar surface of the hatch. Here stripes 37 of an adhesive compound are used between the laminate 36 and the hatch 10 to secure the laminate. Instead of a compound, one could use adhesive tape.

As preferred, the laminate 36 has a thickness of at most 5 millimeters.

As preferred, the laminate 36 has a weight of at most 3.5 kg/m2.

The hatches 10 depicted each have a rigid hatch body, e.g. of aluminum, e.g. welded of aluminum, with three segments seen in direction of the width of the hatch, namely:

opposed first and second side segments 10*a*, 10*b* at the respective sides of the hatch, each side segment being configured to be supported on a support structure, a central segment 10*c* situated in between the side segments.

The side segments 10*a, b* are each inclined downwards from the central segment 10*c* to the respective side of the hatch 10 that rests on the coaming 4*a, b*. For example, the inclination is between 5 and 10 degrees.

As preferred, the central segment 10*c* comprises a substantially horizontal surface, here embodied as a walkway as is preferred.

The figures illustrate, that the side segments 10*a, b* of the hatch 10 each have a top wall with three parallel planar top wall zones extending in direction of the width of the hatch 10. In a practical embodiment, adjacent top wall zones are connected via a recessed gutter portion of the top wall. The photo-voltaic cells 30, here in laminates 36, are mounted in lanes onto these planar top wall zones. As preferred, the laminate 36 is applied directly onto a surface of the hatch, e.g. is adhered by an adhesive, e.g. stripes of adhesive, onto the planar top wall zone.

It is illustrated that, each side segment 10*a, b* of the hatch 10 has a shiftable end plate 10*d, e* and an associated shifting mechanism, e.g. with spindles, which is configured to adjust the width of the hatch, e.g. to the actual width of the hold 2 of the inland waterway cargo vessel. This arrangement is known in the art and is discussed in more detail in EP 1 132 290.

It is illustrated that the side segments 10*a*, 10*b* are of equal width.

The central segment 10*c* is situated higher than the sides of the hatch 10, e.g. at least 40 centimeters higher, here at height that is equal to the adjoining inner ends of the side segments 10*a, b*.

It is illustrated, as preferred, that a central area of the hatch, here the central segment 10*c*, is not provided with photo-voltaic cells 30, and that solely the side segments 10*a, b* are provided with photo-voltaic cells 30, e.g. in three lanes 31, 32, 33.

It is schematically shown that the power converter system 60 is mounted to the central segment 10*c* of the hatch. In embodiments, the system 60, or part thereof, could be mounted underneath one or both of the side segments 10*a,b* of the hatch.

As preferred in practice, the electronics 63 of the system 60 are mounted in a watertight compartment 62 that is accessible from the underside of the hatch 10, e.g. the compartment having a removable cover, e.g. bolted, that can be mounted over an access opening at the underside of then hatch 10.

It is illustrated that the photo-voltaic cells 30 in the laminates 36 of the hatch 10 are connected in groups to a respective one of a set of power converters 63.

Figure 7:
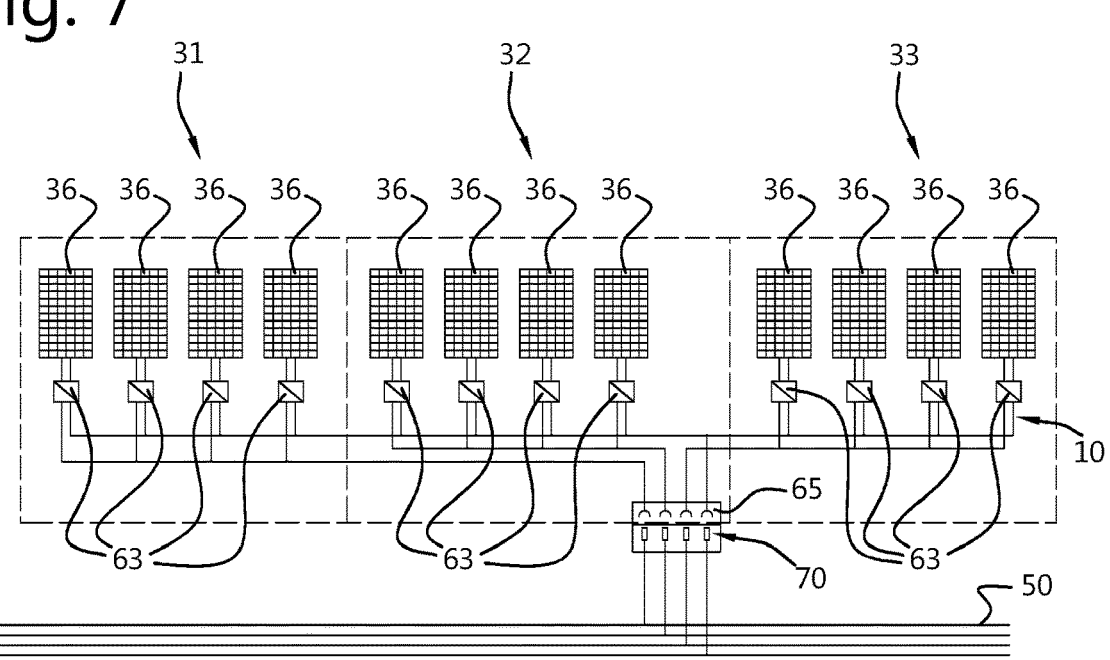
FIG. 7 shows, schematically, the power converter system on the hatches of the vessel of FIG. 1, FIGS. 8a,b, and c illustrate schematically embodiments, of the hatches of the vessel of FIG. 1, FIGS. 9a, b illustrate, in closed and opened condition, a telescoping hatch system wherein hatches slide on respective rails and over one another.

FIG. 7 shows that one lane 31, 32, 33 of cells 30 has four groups of cells 30, each group connected to a respective power converter 63. The four power converters 63 output one phase of the three phase electricity that is outputted by the hatch 10 via its connector 65. Here, as preferred, the connector 65 also has a neutral or ground line.

As will be appreciated, each hatch 10 forms a sort of stand-alone generator of electricity, here outputting three-phase electricity.

In use, any desirable number of hatches 10 having cells 30 can be connected to the grid of the vessel. So, depending on the circumstances, all available hatches 10 having cells 30 are operational to generate electricity. On occasion, the cargo may require that some part of the cargo hold 2 is not covered, e.g. when transporting stacked ISO-freight containers that extend above the coamings 4a, b. Then, when possible, only some of the hatches 10 can be placed over the rest of the hold 2 and used to generate electricity.

In embodiments, the power converter system 60 of the hatch 10 is configured to monitor the voltage and/or frequency at the output side of the converter system, e.g. in the cable 50 of the grid of the vessel, when connected to the connector 70, and is configured to disable the supply of electricity to this consumer, e.g. to the connector 65, in case these measurements indicate that one or both of the voltage and frequency are outside of preset operational windows. It is noted that, as is common in the art, the grid of the vessel 1 will have its own grid controller governing the state of the grid. The power converter system 60 can thus determine whether this grid meets preset requirements and, if not, will not supply electricity generated by the cells 30.

In embodiments, the power converter system 60 of the hatch 10 is configured to monitor the input side thereof, e.g. to determine the operation of the cells 30, e.g. to detect the presence a faulty connection, etc.

For example, the system 60 monitors the resistance between each of the photo-voltaic input conductors to the system and ground, e.g. to determine whether a minimum resistance is present and to shut down the system when the resistance has become too low (e.g. due to defective insulation).

In embodiments, a remote display, e.g. embodied as an app for a mobile telephone, or on another wireless device, panel, is provided to display data related to the operation of the power converter system.

As is known in the art, and as illustrated, the hatches 10 are configured to be placed side-by-side on the coamings 4a, b in their operative position. When not in use for covering the hold 2, e.g. during loading/unloading and'/or during transport of specific cargo, the hatches 10 are lifted and transported to a remote parking position, where they are stacked in one or more stacks, as preferred the stack also being supported on the coamings 4a, b.

As is known in the art, and as illustrated, the hatches 10 are configured to nest into one another when stacking hatches, so as to minimize the height of the stack. For example, the stack may impair the view from the bridge of the vessel 1.

It is illustrated that when stacked, it is preferred, that the hatches 10, including those having cells 30 and integrated power converter system 60 as well as, optionally, connector 65, are to be stacked directly on top of one another without mechanically loading and/or contacting the photo voltaic cells 30 and the power converter system 60. This requires a low height embodiment of both the cells 30, as preferred integrated in the laminate 36 as discussed herein, and of the electronics of the power converter system 60 and associated cabling and/or connector 65. Any increase of stacking height, e.g. due to separate spacers to be placed between hatches 10 to be stacked, would have a negative impact on stacking height and might require extra efforts for personnel when making a stack/de-stacking.

In practical terms, one will first disconnect the connectors 65 and 70 before lifting a hatch 10 from then coamings 4a, b by means of the cart. Then the cart is used, as known in the art, to place the hatch on the stack.

When stacked, only the top hatch is exposed to the sun and may thus generate electricity. The latter may be desirable, e.g. for loading a battery associated with the cart which could also be an option. Yet, in circumstances, it will not be desired that cells 30 of any of the hatches 10 in the stack are exposed to sunlight, e.g. to avoid the possibility that a voltage is generated. For this purpose, one could have the topmost hatch 10 in the stack without cells 30. Another option would be to have hatch system that is provided with a removable cover, e.g. rigid or as a tarpaulin, which is configured to be on the top hatch per stack of hatches in the parking position, so that the photo-voltaic cells of the top hatch are shielded from sunlight.

As explained herein, in embodiments, the hatches 10 having cells 30, or laminates, may be provided with a cooling and/or cleaning system, e.g. a water based cooling and/or cleaning system, e.g. with one or more spray nozzles to spray water over the photo-voltaic cells.

The FIGS. 8a-c, illustrated that the laminate 36 is applied directly onto a surface of the hatch 10, here on a planar portion of the aluminum hatch 10, by an adhesive.

It is shown in FIG. 8a-c that stripes 37 of an adhesive compound are placed between the hatch 10 and the laminate 36. Alternatively, or in combination with an adhesive compound, an adhesive tape could be used for securing the laminate on the hatch.

In FIG. 8c the thickness of the laminate 36 is greater than in the embodiment of FIG. 8b.

FIG. 8b illustrates that for securing the laminate 36 on the hatch 10 one may also, or as an alternative to an adhesive, clamp the laminate 36 onto the hatch 10. For example, clamping strips 38 extend over one or more edge zones of the laminate 36, e.g. along all edge zones or along an opposed pair of edge zones. For example, stud welded bolts are welded to the hatch and the clamping strip(s) are tightened by nuts on these stud welded bolts. This avoids the presence of potential leakage spots in the (metal, e.g. aluminum) hatch. The provision of one or more clamping strips 38 for the laminate, may also provide extra safeguard against undue mechanical contact with the laminate, e.g. when handling and/or stacking hatches. The nuts may be welded to the bolt so as to avoid undoing the nuts.

Figure 9A:
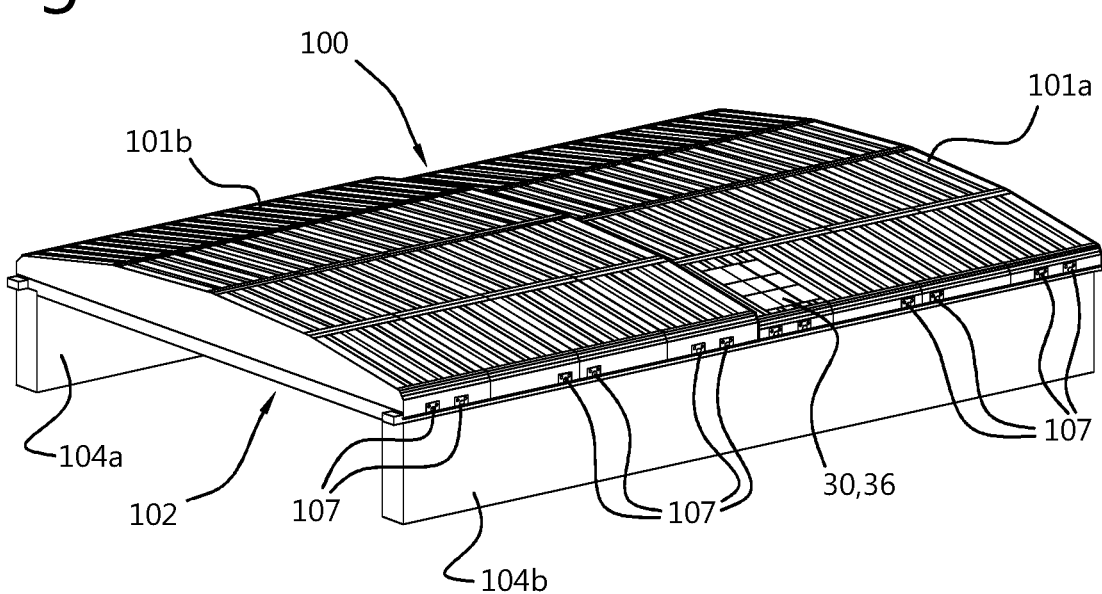
Figure 9B:
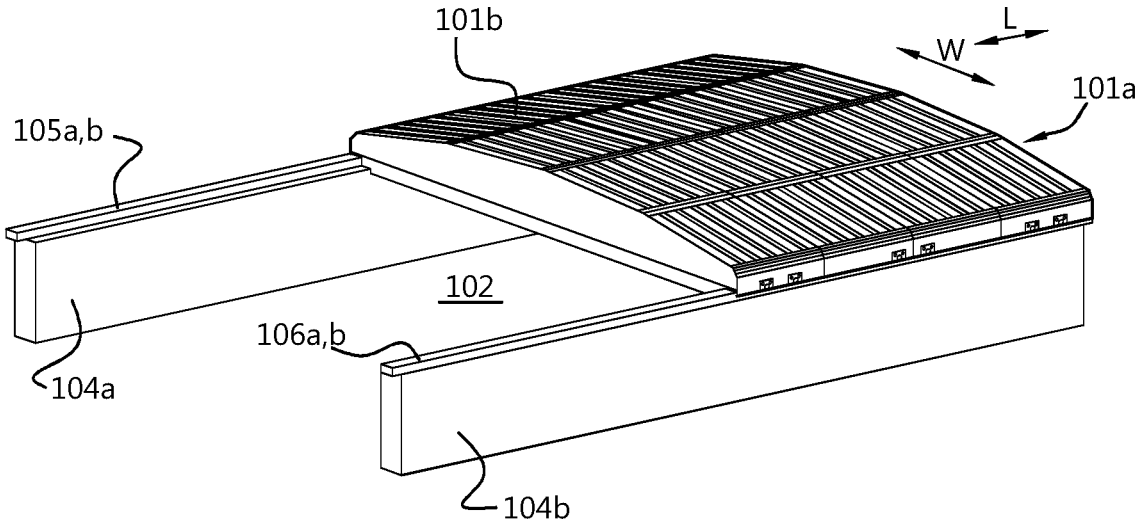

The FIGS. 9a, b illustrate, in a closed and an opened condition respectively, a telescoping hatch system 100, wherein the multiple hatches 101a, 101b each can slide on a pair of respective horizontal rails 105a,b, 106a,b and over one another. For example, as shown, the hatches 101a, b each have rollers 107 riding over the respective rails.

For example, the hatches 101a, b are made of aluminium.

In the closed condition, each hatch 101a, b is in an operative position thereof over a storage space 102, in particular a bulk goods storage space. In the opened condition the hatch 101*b* is slid over the lower hatch 101*a*. In embodiments, another version of the opened condition is that hatch 101*a* is slid underneath hatch 101*b*.

This storage space 102 can be a cargo hold of an inland waterway cargo vessel, like discussed above. The storage space 102 could also be part of a land-based storage facility, e.g. for dry bulk goods, e.g. sand, salt, fertilizer, recycling materials, biomass, etc. The hatch system 100 may serve to prevent or reduces any wind-blown pollution as was common for open air stockpiles for dry bulk commodities.

Here the horizontally sliding or telescoping hatches 101*a,b* form the roof over the bulk goods storage space, e.g. to allow for handling of the bulk goods by means of bulk-handling equipment, e.g. a crane having a bulk handling grab of the facility, that access the space 102 via the opened hatches 101*a,b*.

It will be appreciated that whilst one telescopic system with two sliding hatches 101*a, b* is shown, a storage space 102 may be covered one or more telescopic hatch systems, each having multiple hatches, e.g. more than two hatches per telescopic system.

The hatches 101*a*, 101*b* each have a width W and a length in direction L. Each hatch 101*a, b* is configured to be supported at each one of opposed sides thereof seen in direction of the width of the hatch by a support structure 104*a*, 104*b*. These can be the coamings 4*a,b* of a cargo vessel or walls of a land-based storage facility, or a beam structure of such a storage facility.

As discussed above, at least one of the hatches, here hatch 101*a*, is provided with photo-voltaic cells 30, here in a laminate 36. For simplicity, only one laminate 36 is depicted, but clearly multiple laminates can be present on the hatch 101*a*. It will be appreciated that when a laminate 36 as discussed herein is applied, little or no extra height is required in the telescopic hatch system to accommodate the laminate 36. It will be appreciated, that during motion between opened and closed condition, and when opened, there is no mechanical loading and/or contacting of the photo-voltaic cells 30 and the power converter system integrated with the hatch.

As discussed, the hatch 101*a* having the cells 30, e.g. in laminate 36, has, integrated therewith, a power converter system that is connected to the photo-voltaic cells 30 and that is configured to convert the electrical energy entering the converter system into another output form of electricity. As preferred, the converter system. This converter system here is mounted, as preferred, underneath the hatch in a watertight compartment. The hatch 101*a* can be provided with an electrical connector that is integrated with the hatch, e.g. as discussed for connector 65, for connection to a grid and/or a remote consumer of the outputted electricity. Yet, the hatch system could also comprise a sliding electrical connector assembly, an (motorized) cable reel, a drag chain with an electrical cable, etc., as an alternative to a readily releasable electrical connector that is integrated with the hatch.

It is shown in FIGS. 9*a, b* that the hatch 101*a* has—seen in cross-section along the length L thereof—a corrugated top surface, e.g. of aluminium. Here, a support member, e.g. a support plate or the like, is mounted, e.g. of aluminium, e.g. welded, over multiple corrugations to provide a planar top wall zone on which a laminate 36 as discussed herein is placed. For example, the laminate 36 is secured as discussed herein.

It is shown in FIGS. 9*a, b* that, when opened, only the top hatch 101*b* is exposed to the sun and may thus generate electricity. The latter may be desirable. Yet, in circumstances, it will not be desired that cells 30 of any of the hatches 101*a,b* of the opened telescopic hatch system are exposed to sunlight, e.g. to avoid the possibility that a voltage is generated. For this purpose, one could have the topmost hatch 101*b* without cells 30. Having a topmost hatch of a telescopic hatch system without, so devoid of, cells 30 may also be beneficial in view of the potential for damage of cells during loading and/or unloading. For example, when the storage space is to be filled with bulk goods, a bulk handling grab may spill over and the bulk material may then fall on the topmost hatch 101*b* of the opened system. As no cells 30 are then present on said hatch 101*b*, and as the one or more hatches 101*a* underneath are effectively shielded, no damage is done to cells 30, laminate(s) 36 on said one or more lower hatches 101*a* of the telescopic hatch system.

The invention claimed is:

1. An inland waterway cargo vessel having a cargo hold with an open top having a width and having a length defined by opposed longitudinal edges, wherein the vessel has a coaming along each longitudinal edge of the open top of the cargo hold, each coaming being provided with at least one horizontal rail, wherein the vessel is provided with a telescopically sliding hatch system having a set of hatches configured to slide horizontally over each other in a telescoping manner and in an operative position of each of the hatches covering the cargo hold, wherein a sliding hatch of the set of hatches is, at each of opposed sides of the sliding hatch, slidable over an associated horizontal rail provided on the coaming, wherein the vessel has an electrical grid comprising a consumer, wherein a surface area of at least one sliding hatch of the set of hatches is provided with photo-voltaic cells, wherein the at least one sliding hatch comprises, integrated with the at least one sliding hatch, a power converter system connected to the photo-voltaic cells and configured to be connected to the electrical grid of the vessel, and wherein the power converter system integrated with the at least one sliding hatch is configured to convert electrical energy generated by the photo-voltaic cells and entering the power converter system into an output form of electricity corresponding to the electrical grid of the vessel.

2. The inland waterway cargo vessel according to claim 1, wherein an electrical connector is integrated with the at least one sliding hatch, and wherein the electrical grid of the vessel comprises one or more electrical cables provided with an electrical connector at the operative position of the at least one sliding hatch allowing to connect the electrical connector of the at least one sliding hatch in the operative position thereof to the electrical grid of the vessel.

3. The inland waterway cargo vessel according to claim 2, wherein the one or more electrical cables extend along the coaming of the cargo hold.

4. The inland waterway cargo vessel according to claim 1, wherein the electrical grid of the vessel is a three-phase grid, and wherein the power converter system of the at least one sliding hatch is configured to output electricity as three-phase electricity.

5. The inland waterway cargo vessel of claim 4, wherein the photo-voltaic cells of the at least one sliding hatch are arranged in three parallel lanes, each lane of photo-voltaic cells providing electrical energy for one of the three phases of the three-phase electricity.

6. The inland waterway cargo vessel according to claim 1, wherein sets of the photo-voltaic cells are laminated between protective top and backing layers to form a laminate, the laminate having a thickness of at most 5 millimeters.

7. The inland waterway cargo vessel according to claim 6, wherein the laminate has a weight of at most 3.5 kg/m2.

8. The inland waterway cargo vessel according to claim 6, wherein the laminate is applied directly onto a surface of the sliding hatch by an adhesive.

9. The inland waterway cargo vessel according to claim 6, wherein the laminate is clamped on the sliding hatch.

10. The inland waterway cargo vessel according to claim 9, wherein clamping strips extend over one or more edge zones of the laminate, and wherein stud welded bolts are welded to the sliding hatch and the clamping strips are tightened by nuts on the stud welded bolts.

11. The inland waterway cargo vessel according to claim 1, wherein the power converter system of the sliding hatch is mounted in a compartment accessible from an underside of the sliding hatch.

12. The inland waterway cargo vessel according to claim 1, wherein the at least one sliding hatch is further provided with one or more spray nozzles to spray water over the photo-voltaic cells.

13. The inland waterway cargo vessel according to claim 1, wherein the power converter system of the at least one sliding hatch is configured to monitor at least one of a voltage and a frequency at an output side of the power converter system when connected to the electrical grid of the vessel and is configured to disable the supply of electricity to the electrical grid in case a measurement indicating that one or both of the voltage and frequency are outside of preset operational windows.

14. The inland waterway cargo vessel according to claim 1, wherein the inland waterway vessel is a push barge system with a push boat and at least one push barge, wherein the push barge has said cargo hold and said coaming along each longitudinal edge of said open top of the cargo hold, wherein the push barge is provided with said telescopically sliding hatch system, wherein the consumer is located on the push boat, and wherein the electrical grid comprises one or more electrical cables extending between the push barge and the push boat.

15. The inland waterway cargo vessel according to claim 14, wherein the consumer is one of an electric propulsion drive motor of the push boat and a generator for hydrogen used to fuel a propulsion drive of the push boat.

16. The inland waterway cargo vessel according to claim 2, wherein the electrical grid of the vessel is a three-phase grid, and wherein the power converter system of the at least one sliding hatch is configured to output electricity as three-phase electricity.

* * * * *